United States Patent [19]

Metz

[11] Patent Number: 5,291,410
[45] Date of Patent: Mar. 1, 1994

[54] CIRCUITRY FOR SYNCHRONIZING THE SPEED OF A PLURALITY OF ENGINES BY SEQUENTIALLY AVERAGING PHASE DIFFERENCE WITH A REFERENCE PHASE REPRESENTING A DESIRED SPEED

[75] Inventor: Joseph E. Metz, South Bend, Ind.

[73] Assignee: Allied-Signal Inc., Morristown, N.J.

[21] Appl. No.: 762,838

[22] Filed: Sep. 19, 1991

[51] Int. Cl.[5] .................... G06F 15/48; B63H 3/00
[52] U.S. Cl. .................... 364/431.07; 364/431.01; 364/565; 416/34
[58] Field of Search ............... 364/424.1, 431.01, 565; 73/862.326, 866; 416/34; 180/14.3; 60/39.281

[56] References Cited

U.S. PATENT DOCUMENTS

| | | | |
|---|---|---|---|
| 3,689,175 | 9/1970 | Hartzell et al. | 364/565 |
| 3,892,952 | 7/1975 | Shibata et al. | 364/565 |
| 3,969,890 | 7/1976 | Nelson | 60/39.15 |
| 4,004,648 | 1/1977 | Joseph et al. | 180/14.3 |
| 4,245,955 | 1/1981 | Lambertson | 364/431.01 |
| 4,306,449 | 12/1981 | Hoffman | 364/431.01 |
| 4,383,303 | 5/1983 | Hoffman | 364/565 |
| 4,410,948 | 10/1983 | Doniger et al. | 364/431.01 |
| 4,434,470 | 2/1984 | Thomas et al. | 364/565 |
| 4,485,452 | 11/1984 | Cording et al. | 364/565 |
| 4,653,981 | 3/1987 | Harner et al. | 416/34 |
| 4,659,283 | 4/1987 | Niessen et al. | 416/34 |
| 4,716,723 | 1/1988 | Ralston et al. | 60/39.281 |
| 4,817,046 | 3/1989 | Rice et al. | 364/551.01 |
| 4,964,276 | 10/1990 | Sturdy | 60/700 |
| 4,979,398 | 12/1990 | Goodzey et al. | 73/862.326 |

FOREIGN PATENT DOCUMENTS 20322343 6/1989 European Pat. Off. .
2839313A1 3/1980 Fed. Rep. of Germany .

Primary Examiner—Thomas G. Black
Assistant Examiner—Jacques H. Louis-Jacques
Attorney, Agent, or Firm—Leo H. McCormick, Jr.; Larry J. Palguta; Robert A. Walsh

[57] ABSTRACT

A control circuit for synchronizing the speed of a plurality of engines of an aircraft. The control circuit includes first and second counters for counting pulses in a reference pulse train and an engine speed pulse train over a predetermined time interval and third and fourth counters for determining the time between the last pulse of the reference pulse train counted during the predetermined time interval and the end of that time interval and the time between the last pulse of the engine speed pulse train counted during the predetermined time interval. The frequencies of the reference pulse train and speed pulse train in conjunction with inputs from the first, second, third and fourth counters are used to compute an average phase difference between the reference and speed pulse trains over the predetermined time interval. A fuel regulator responsive to a signal representative of the average phase difference controls the flow of fuel to the engines to modify their respective speeds to synchronize the engines' speed with a reference phase corresponding to an independently generated master signal.

7 Claims, 3 Drawing Sheets

CIRCUITRY FOR SYNCHRONIZING THE SPEED OF A PLURALITY OF ENGINES BY SEQUENTIALLY AVERAGING PHASE DIFFERENCE WITH A REFERENCE PHASE REPRESENTING A DESIRED SPEED

The present invention relates generally to circuitry for determining the phase difference between two input signals and more particularly to the application of such a circuit to multi-engine speed control systems.

It is common among pilots of even small private twin engine aircraft to manually make very minor adjustments to the speed of one of the engines to bring it into close conformity with the speed of the other engine to minimize vibration and noise or "wow." This is typically accomplished by the pilot based on the sound of the engines.

Multi-engine speed control circuits are also well known and illustrated, for example, by U.S. Pat. Nos. 4,653,981 and 4,659,283 to Harner et al and Niessen et al respectively. In the schemes shown in these patents, the propeller pitch of a "slave" engine is fine-tuned so as to operate at the same speed as the "master" engine and eliminate any "wow" between the two (or more) engines. This fine-tuning is accomplished according to master and slave speed input informations as well as master and slave phase input informations. In particular, the phase difference between the master and slave is compared to a reference phase difference to generate a phase error signal which is used to impart a very fine amount of propeller speed control to the slave engine bringing it into close conformity with the speed of the master engine.

Niessen et al effect a rough control by comparing the speeds of the master and slave engines followed by a fine-tuning based on the phase difference between the master and slave engines. In these two patented arrangements, the "phase sensor" is of an unknown type.

While propeller pitch is controlled in the above mentioned patented arrangements, fuel flow could also be controlled to effect fine-tuning of the speed of one or more engines and eliminate "wow". Computer control of gas turbine engines is well established with the Ralston et al U.S. Pat. No. 4,716,723 being but a single example. Ralston et al employ a FADEC (Full Authority Digital Electronic Control) to control the flow rate of fuel to an engine. While the primary Ralston et al purpose is to prevent overspeeding, a system such as that of Ralston et al can be adapted according to the present invention to effect a phase comparison based fine-tuning of engine speed as well.

Finally, engine speed measurement systems and measured speed based fine tuning of engine speed is well known and is typified by Thomas et al U.S. Pat. No. 4,434,470 and Cording et al U.S. Pat. No. 4,485,452. In each of these speed control systems, engine speed is determined from an engine driven toothed wheel rotating past a magnetic pickup to generate a pulse train the repetition rate of which is related (by the number of teeth on the wheel) to engine speed.

Applicant's assignee currently manufactures the EH-AB2 Full Authority Digital Electronic Control (FADEC) which includes an Event Frequency Interface (EFI) integrated circuit chip and may be used as part of a speed control system in controlling for example, a pair of turbo fan engines, turboshafts or turboprops. This commercially available product incorporates many of the principles of the last two mentioned patents.

While systems according to these last two patents work well in practice as electronic speed governing devices, it would be desirable to increase their accuracy so as to also be able to employ them as fine-tuning circuits to synchronize one or more slave engines to a master engine or to an independent master speed signal source.

Among the several objects of the present invention may be noted the provision of a phase difference computing circuit; the provision of an engine control circuit which "fine tunes" the difference in speed between two engines; the provision of an engine control circuit in accordance with the previous object which effects the fine tuning based on a determination of successive differences in phase between two engine speed indicative signals. The provision of an engine control circuit which "fine tunes" the difference in speed between two or more engines based on a determination of successive differences in phase between engine speed indicative signals and a master reference signal; and the provision of an engine speed control circuit in which all engine fuel control circuits are fine-tuned to bring the engines into close harmony according to a phase angle comparison with an independently generated master signal. These as well as other objects and advantageous features of the present invention will be in part apparent and in part pointed out hereinafter.

In general, an engine control circuit for making small adjustment in the difference in speed between two or more engines based on a determination of successive differences in phase between two engine speed indicative signals has a first engine driven encoder for providing a first pulse train the repetition rate of which is indicative of the speed of one engine and a second engine driven encoder for providing a second pulse train the repetition rate of which is indicative of the speed of another engine. An independently generated master signal may be used instead and all engines made to conform to a speed indicated by that independent signal. A first counter for counting pulses in the first pulse train over a predetermined time interval and a second counter for counting pulses in the second pulse train over the same predetermined time interval provide two pieces of information for computing the average phase difference between the two signals over the predetermined time interval. A third counter for determining the time between the last pulse of the first pulse train counted during the predetermined time interval and the end of that time interval and a fourth counter for determining the time between the last pulse of the second pulse train counted during the predetermined time interval and the end of the time interval provide two additional pieces of information. The frequencies of the first and second pulse trains are computed (one is known in the case of an independent reference) and these computed frequencies and the counts determined by the first, second, third and fourth counters are used to compute the average phase difference between the first and second pulse trains over the predetermined time interval. A fuel control regulator is responsive to the computation to control the flow of fuel to one of the engines to modify the speed of that engine to bring it into closer conformity with the speed of the other engine. The repetition rate of the first and second pulse trains are each the same integral multiple n of their respective engines' speed, $F_m$ is the frequency of the first pulse train, Fs is the frequency of the second pulse train, Tcm is the first pulse count, Tcs is the second pulse count, Tvm is the time between last pulse of the first pulse train and the end of the time interval, Tvs is the time between the last pulse of the second pulse train and the end of the time interval, and the phase difference between the first and second pulse trains is determined by iteratively maintaining a total pulse count Tct by interactively computing Tct=Tct+Tcm−Tcs with multiples of n added or subtracted to maintain it between ±n, (where n is the number of pulse counts per 360° revolution) and then computing the phase difference P from the equation $$P = \frac{(Tvm - Tvs + Tct/Fm) * Fm * 360}{n}$$

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
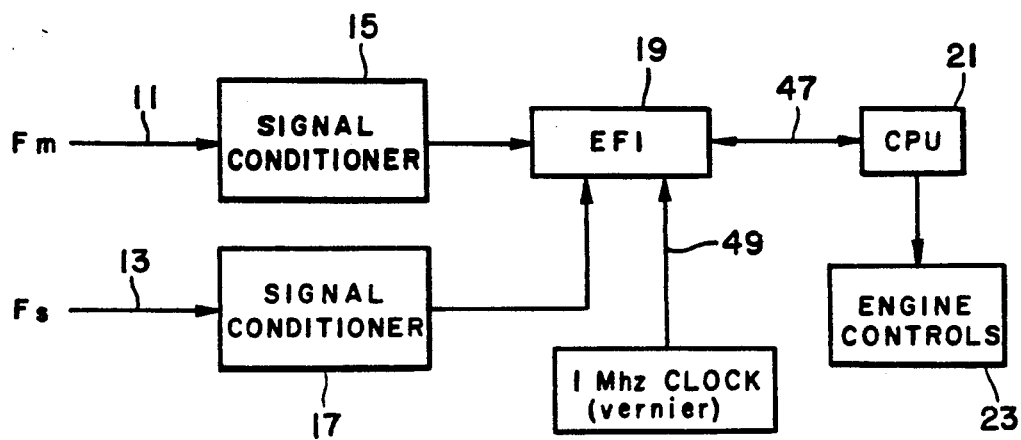
FIG. 1 is a schematic block diagram illustrating an engine speed control system in which the concept for determining the phase difference between master and slave input signals may be incorporated.
Figure 2:
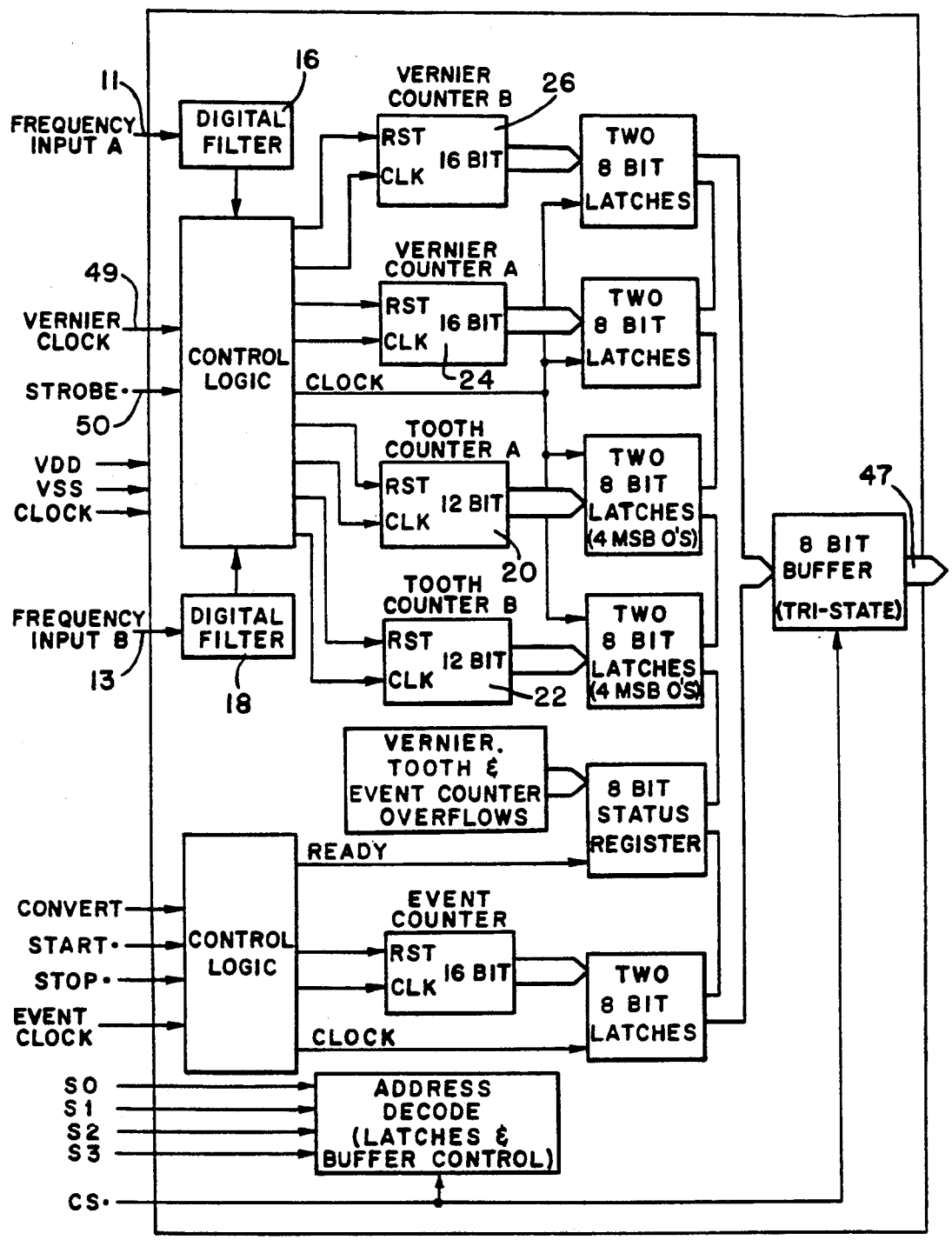
FIG. 2 is a block diagram of a known Event Frequency Interface integrated circuit chip which forms a part of the circuit of FIG. 1.

FIG. 1 depicts an engine speed control circuit in which the present invention finds particular utility. A master engine speed indicative signal on line 11 and a slave (controlled) engine speed indicative signal on line 13 are shaped or conditioned and supplied to an interface 19. The interface communicates with a central processing unit 21 to determine engine speed by known prior techniques, and the speed of the slave engine is controlled by regulating the fuel supply at 23. The event frequency interface (EFI) 19 of FIG. 1 may be implemented as shown in FIG. 2. The signal conditioners 15 and 17 may be separate from the chip of FIG. 2 or may be integrated therewith as the indicated digital filters 16 and 18. Both may in some instances be used. This known chip incorporates the CPU 21 interface logic for two frequency inputs on lines 11 and 13 and one "event" input. A bus interface (buffer) is used to read data and status bits from the chip and all chip inputs and outputs are TTL compatible.

Figure 3:
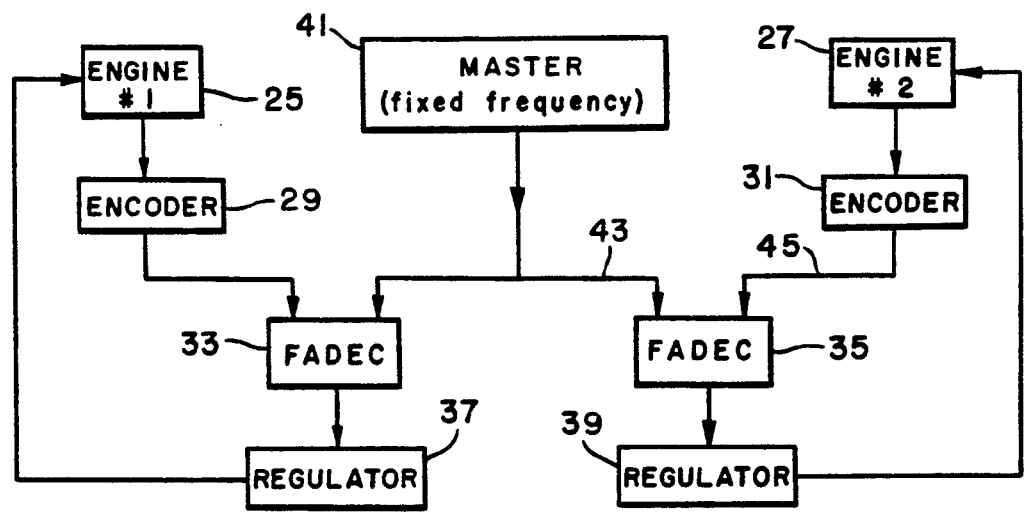
FIG. 3 is a schematic block diagram of an engine speed control system incorporating the concepts of FIG. 1 and in which two engine speeds are conformed to an independent master signal.

In FIG. 3, a pair of engines 25 and 27 such as General Electric CFE738 Turbo Fan engines are coupled to encoders 29 and 31 which, for example, may be toothed wheels or gears with adjacent magnetic or optical pickup devices for providing speed indicative pulse trains as taught in the above mentioned Thomas et al patent. Either one of these signals may be considered to be the master signal and the other the slave as in the discussion of FIG. 1. As an alternative, an independent master frequency signal source 41 operating at a selectable fixed frequency independent of the encoders may be used and each engine speed signal compared thereto. In FIG. 3, the signal on line 43 is the master signal analogous to the signal on line 11 in FIG. 1 and the signal on line 45 is the slave signal analogous to the slave signal on line 13 of FIG. 1. These two signals are supplied to a FADEC (Full Authority Digital Electronic Control) unit 35 which includes a central processor unit as well as input-output buffers, and in particular, the EFI chip of FIG. 2.

The engine control circuit of FIG. 3 is adapted for making small adjustments in the difference in speed between two (or more) engines 25 and 27 based on a determination of successive differences in phase between engine speed indicative signals and a master reference signal from frequency generator 41. The reference pulse train generator 41 provides a first pulse train while one or more engine driven encoders 29 and 31 provide one or more second pulse trains the respective repetition rates of which are indicative of the speed of the respective engines. FADEC's 33 and 35 each include a CPU and an EFI similar to that of FIG. 2. A first counter 20 counts the pulses in the first (reference) pulse train over a predetermined time interval as set by signals on strobe line 50. A second counter 22 counts the pulses in the second engine speed indicative pulse train over the same predetermined time interval. A third counter 24 determines the time between the last pulse of the first pulse train counted during the predetermined time interval and the end of that time interval while a fourth counter 26 determines the time between the last pulse of the second pulse train counted during the predetermined time interval and the end of that time interval. The CPU computes the frequencies of the first (if necessary) and the second pulse trains. The phase difference is then computed utilizing the computed frequencies and the counts determined by the first, second, third and fourth counters to compute the average phase difference between the first and second pulse trains over the predetermined time interval. Regulators 39 and 37 are controlled accordingly to supply more or less fuel to the corresponding engine in responsive to the phase differences to modify the speed of that engine to bring it into closer conformity with a speed indicated by the frequency of the reference pulse train or that of the other engine.

As seen in FIG. 3, each engine is provided with an encoder 29 or 31 as well as with first, second, third and fourth counters on the EFI chip in FADEC 33 or 35 as well as the CPU's for computing engine speed indicative pulse train frequencies and phase difference computing means and all engines are provided with fuel control circuits 37 and 39, all of these fuel control circuits are responsive to their respective phase difference computing circuits for fine-tuned their respective speeds to bring the engines' speeds into close harmony according to phase angle comparisons with the independently generated master signal.

The FADEC 35 which, by way of a fuel flow regulator 39, controls the speed of engine 27, may be substantially the same as taught in the above mentioned Ralston et al patent. Regulator 39 may, for example, be a torque motor that regulates fuel flow. Synchronization of the speed of engine 25 with the signal from independent source 41 is accomplished in the same manner.

Figure 4:
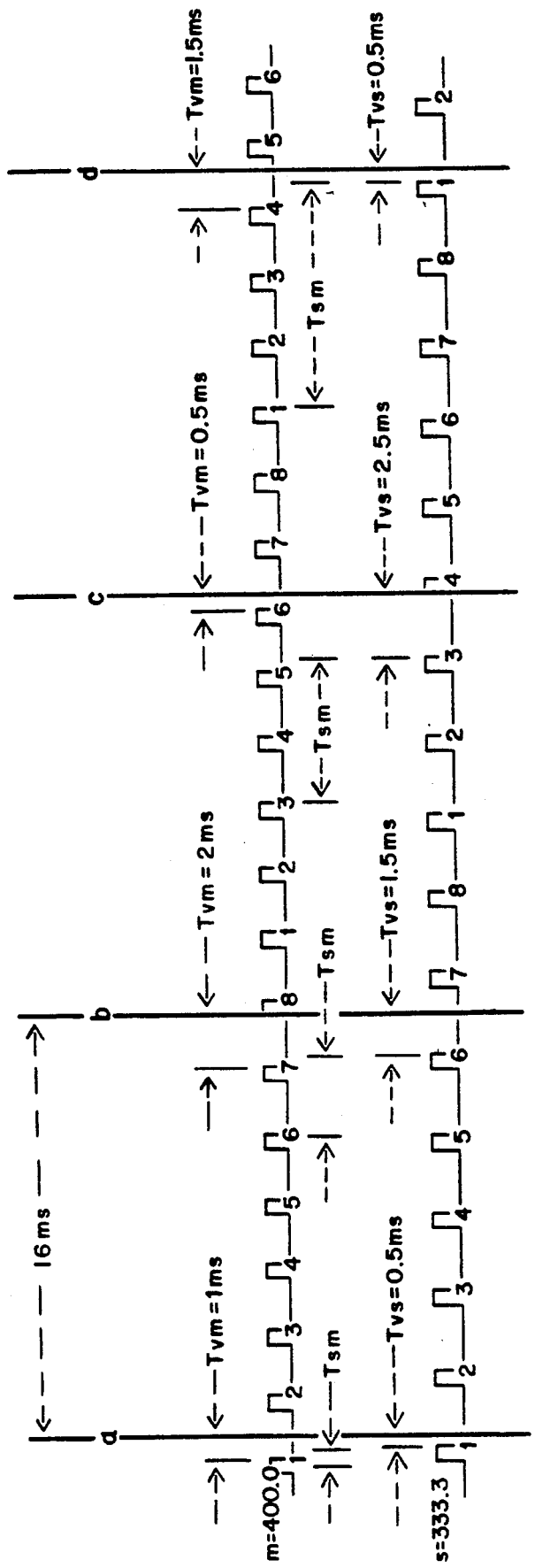
FIG. 4 illustrates two input waveforms for the circuit of FIG. 1.

In FIG. 4, a pair of illustrative engine speed indicative pulse trains of 400 and 333 Hz respectively are illustrated. The phase difference P between these two frequencies using the master frequency as reference is determined by the equation $$P = \frac{Tsm * Fm * 360}{n} = \frac{(Tvm - Tvs + Tct/Fm) * Fm\; 360}{n}$$

where Tct is computed iteratively from Tct=Tct+Tcm−Tcs with multiples of n added or subtracted to maintain it between ±n, Tsm=Tvm−Tvs+Tct/Fm, and where
Fm=frequency of the master signal
Fs=frequency of the slave signal
Tsm=time between slave and master teeth
Tct=tooth counts total (initialized to zero)
Tcm=tooth counts master (assume zero for the first iteration)
Tcs=Tooth counts slave (assume zero for the first iteration)
Tvm=time between last master tooth and iteration strobe
Tvs=time between last slave tooth and iteration strobe
n=number of pulses per revolution. Tvm and Tvs are computed from the vernier count at 24 and 26 respectively in FIG. 2 while Tcm and Tcs are from counters 20 and 22. While the above refers to "tooth counts", it is clear that where a master signal is independently generated it is really a count of the number of pulses which is being considered.

While other fixed time intervals may be used, in FIG. 4, this computation is repeated every 16 ms. The following are illustrative computations for FIG. 4 at times a, b, c and d with encoders having 8 teeth (n=8).

a) $Tct = 0 + 0 + 0 = 0$
$$P = \frac{(1/1000 - 0.5/1000 + 0/400) * 400 * 360}{8} = 9 \text{ degrees}$$

b) $Tct = 0 + 6 - 5 = 1$
$$P = \frac{(2/1000 - 1.5/1000 + 1/400) * 400 * 360}{8} = 54 \text{ degrees}$$

c) $Tct = 1 + 7 - 5 = 3$
$$P = \frac{(0.5/1000 - 2.5/1000 + 3/400) * 400 * 360}{8} =$$

99 degrees d) $Tct = 3 + 6 - 6 = 3$
$$P = \frac{(1.5/100 - 0.5/1000 + 3/400) * 400 * 360}{8} =$$

153 degrees

Substantially the same computation may be stated in a number of different ways. For example, the following equation may be executed at the same fixed iteration rate the speed signals are read (once between each strobe interrupt signal on line 50 in FIG. 2) according to the following relationship:

$$P = [(Tvm - Tvs) * Fm/Vf + Tct] * 360$$

where Vf=Vernier counter frequency.

The method of operation of the invention should now be clear. The speed on an aircraft engine to bring that engine speed into close conformity with a reference signal includes generating a reference pulse train (which may be independent such as 41, or may be derived from an encoder such as 29 on a "master engine". An engine speed indicative pulse train is generated by an encoder 31, the repetition rate of which is an integral multiple of the speed of the engine 27. Circuitry in FADEC 35 counts the number of pulses in the reference pulse train on line 43 over a predetermined time interval as well as counting the number of pulses in the engine speed indicative pulse train on line 45 over the same predetermined time interval. Measures of the time between the last reference pulse counted during the predetermined time interval and the end of that time interval and the time between the last engine speed indicative pulse counted during the predetermined time interval and the end of that time interval are also generated. The two pulse counts and the two time measurements are then utilized to determine the average phase difference between the two generated pulse trains over the predetermined time interval. This average phase difference is then used to control the fuel supply to the engine. Each of these steps may be repeated during a subsequent equal time interval to determine the average phase difference between the two generated pulse trains over the subsequent predetermined time interval, and the fuel supply to the engine varied according to the difference between the two average phase differences. If the subsequent phase difference is unchanged, no change in engine speed is called for.

In summary, the invention has a number of advantages over known prior schemes and in particular allows for a "fine tuning" of the difference in speed between aircraft engines.

From the foregoing, it is now apparent that a novel aircraft engine control arrangement has been disclosed meeting the objects and advantageous feature set out hereinbefore as well as others, and that numerous modifications as to the precise shapes, configurations and details may be made by those having ordinary skill in the art without departing from the spirit of the invention or the scope thereof as set out by the claims which follow.

I claim:

1. An engine control circuit for making small adjustments in the difference in speed between two or more engines based on a determination of successive differences in phase between two engine speed indicative signals comprising:
   a first engine driven encoder for providing a first pulse train having a repetition rate which is indicative of the speed of one engine;
   a second engine driven encoder for providing a second pulse train having a repetition rate which is indicative of the speed of another engine,
   a first counter for counting pulses in said first pulse train over a predetermined time interval;
   a second counter for counting pulses in said second pulse train over said predetermined time interval;
   a third counter for determining any differences in time between the last pulse of said first pulse train counted during the predetermined time interval and the end of that time interval;
   a fourth counter for determining any differences in time between the last pulse of said second pulse train counted during the predetermined time interval and the end of that time interval;

means for computing first and second frequencies for said first and second pulse trains;

means utilizing said first and second computed frequencies and counts determined by the first, second, third and fourth counters to compute an average phase difference between said first and second pulse trains over said predetermined time interval, said average phase difference being computed from the following equation:

$$P = \frac{(Tvm - Tvs + Tct/Fm) * Fm * 360}{n}$$

where: said repetition rate of said first and second pulse trains each have the same integral multiple n of their respective engines' speed; Fm is the frequency of said first pulse train; Fs is the frequency of said second pulse train; Tcm is the first pulse count; Tcs is the second pulse count; Tvm is the time between last pulse of said first pulse train and the end of the time interval; Tvs is the time between the last pulse of said second pulse train and the end of the time interval; and the phase difference between said first and second pulse trains is determined by interatively maintaining a total pulse count Tct by interatively computing Tct=Tct+Tcm−Tcs with multiples of n added or subtracted to maintain it between±n; and means responsive to said average phase difference for controlling the flow of fuel to one of the engines to sequentially modify the speed of that engine to bring it into closer conformity with the speed of the other engine;

2. An engine control circuit for making small adjustments in the difference in speed between two or more engines based on a determination of successive differences in phase between engine speed indicative signals and a master reference pulse train comprising:

a master reference pulse train generator for providing a first pulse train;

an engine driven encoder for providing a second pulse train having a repetition rate which is indicative of the speed of an engine;

a first counter for counting pulses in said first pulse train over a predetermined time interval;

a second counter for counting pulses in said second pulse train over said predetermined time interval;

a third counter for determining any differences in time between a last pulse of said first pulse train counted during said predetermined time interval and the end of that time interval;

a fourth counter for determining any differences in time between the last pulse of said second pulse train counted during said predetermined time interval and the end of that time interval;

means for computing first and second frequencies for said first and second pulse trains;

phase difference computing means utilizing said first and second frequencies and the counts determined by the first, second, third and fourth counters to compute an average phase difference between said first and second pulse trains over said predetermined time interval, said average phase being computed from the following equation:

$$P = \frac{(Tvm - Tvs + Tct/Fm) * Fm * 360}{n}$$

where: said repetition rate of said second pulse train is an integral multiple n of said engine's speed; Fm is the frequency of said first pulse train; Fs is the frequency of said second pulse train; Tcm is the first pulse count; Tcs is the second pulse count; Tvm is the time between last pulse of said first pulse train and the end of the time interval; Tvs is the time between the last pulse of said second pulse train and the end of the time interval; and the phase difference between said first and second pulse trains is determined by interatively maintaining a total pulse count Tct by iteratively computing Tct=Tct+Tcm−Tcs with multiples of n added or subtracted to maintain it between±n; and means responsive to said average phase difference for controlling the flow of fuel to said engine to sequentially modify the speed of said engine to bring the speed of said engine into closer conformity with a speed indicated by the frequency of said first pulse train.

3. A method of controlling the speed on an aircraft engine to bring its engine speed into close conformity with a reference signal comprising the steps of:

generating a reference pulse train;

generating an engine speed indicative pulse train the repetition rate of which is an integral multiple of the speed of the engine;

counting the number of pulses in the reference pulse train over a predetermined time interval;

counting the number of pulses in the engine speed indicative pulse train over said predetermined time interval;

providing a measure of the time between the last reference pulse counted during said predetermined time interval and the end of that time interval;

providing a measure of the time between the last engine speed indicative pulse counted during the predetermined time interval and the end of that time interval;

determining the frequency of the engine speed pulse train;

utilizing the two pulse counts and the two time measurements to determine a first average phase difference between the two generated pulse trains over the predetermined time interval, said average phase being computed from the following equation;

$$P = \frac{(Tvm - Tvs + Tct/Fm) * Fm * 360}{n}$$

where: n is the integral multiple of the speed of the engine; Fm is the frequency of the referenced pulse train; Fs is the frequency of the speed indicative pulse; Tcm is the reference pulse count; Tcs is the engine speed pulse count; Tvm is the time between the last reference pulse and the end of the time interval; Tvs is the time between the last engine speed pulse and the end of the time interval; and the phase difference between the speed indicative pulse train and the reference pulse train is determined by iteratively maintaining a total tooth count Tct by iteratively computing Tct=Tct+Tcm−Tcs with multiples of n added or subtracted to maintain it between±n; and utilizing said first average phase difference to control the fuel supply to the engine.

4. The method of claim 3 including the additional steps of:

repeating each of the steps during a subsequent equal time interval to determine a second average phase difference between the two generated pulse trains during said subsequent time interval; and varying the fuel supply to the engine in accordance with any differences between the first and second average phase differences.

5. The method of claim 3 wherein the step of generating a reference pulse train comprises generating another engine speed indicative pulse train the repetition rate of which is said integral multiple of the speed of another aircraft engine to thereby vary the speed of said engine to conform to the speed of said another engine.

6. The method of claim 3 wherein the step of generating a reference pulse train comprises generating a signal having a repetition rate which is said integral multiple of a desired engine speed.

7. The method of claim 3 including the further steps of:

generating another engine speed indicative pulse train the repetition rate of which is an integral multiple of the speed of another engine;

counting the number of pulses in the another engine speed indicative pulse train over said predetermined time interval;

providing a measure of the time between the last another engine speed indicative pulse counted during the predetermined time interval and the end of that time interval;

utilizing the another engine speed pulse count, the time between the last another engine speed indicative pulse and the end of the time interval, the reference pulse count and the time between the last reference pulse counted during the predetermined time interval and the end of that time interval to determine a second average phase difference between the reference pulse train and the another engine speed indicative pulse train over the predetermined time interval; and utilizing said second average phase difference to control the fuel supply to said another engine thereby controlling the speed of said another aircraft engine to also bring that engine speed into close conformity with the reference signal.

* * * * *